(12) United States Patent
Blerkom et al.

(10) Patent No.: US 7,428,015 B2
(45) Date of Patent: Sep. 23, 2008

(54) IMAGE SENSOR AND OFFSET-ABLE REFERENCE VOLTAGE GENERATOR THEREOF

(75) Inventors: Daniel Van Blerkom, Pasadena, CA (US); I-Shiou Chen, Hsinchu (TW)

(73) Assignee: Sunplus Technology Co, Ltd., Hsinchu (TW)

( * ) Notice: Subject to any disclaimer, the term of this patent is extended or adjusted under 35 U.S.C. 154(b) by 727 days.

(21) Appl. No.: 10/905,358

(22) Filed: Dec. 29, 2004

(65) Prior Publication Data
US 2005/0237400 A1    Oct. 27, 2005

(30) Foreign Application Priority Data
Apr. 23, 2004    (TW) .............................. 93111372 A

(51) Int. Cl.
*H04N 3/14*    (2006.01)
*H04N 5/335*   (2006.01)

(52) U.S. Cl. ...................... 348/308; 348/310; 250/208.1

(58) Field of Classification Search ................. 348/241, 348/302, 308, 310; 250/208.1; 327/94
See application file for complete search history.

(56) References Cited

U.S. PATENT DOCUMENTS 6,677,996 B1 *   1/2004   Chung et al. .............. 348/308
2003/0133627 A1 * 7/2003   Brehmer et al. .......... 382/308

\* cited by examiner

*Primary Examiner*—Ngoc-Yen T. Vu
*Assistant Examiner*—Joel Fosselman
(74) *Attorney, Agent, or Firm*—Jianq Chyun IP Office

(57) ABSTRACT

An image sensor and offset-able reference voltage generator thereof are provided. The image sensor comprises a plurality of pixels, an offset-able reference voltage generator and a pixel sampling circuit. The pixel senses light from an image and generate an image signal. The offset-able reference voltage generator provides a reference voltage having a voltage offset. The pixel sampling circuit is coupled to the pixels and the offset-able reference voltage generator to sample the image signal and generate a pixel signal according to the reference voltage. The voltage offset of the reference voltage is able to compensate for the offset voltage in the process of generating the pixel signals.

8 Claims, 4 Drawing Sheets

IMAGE SENSOR AND OFFSET-ABLE REFERENCE VOLTAGE GENERATOR THEREOF

CROSS-REFERENCE TO RELATED APPLICATION

This application claims the priority benefit of Taiwan application serial no. 93111372, filed Apr. 23, 2004.

BACKGROUND OF THE INVENTION

1. Field of the Invention

The present invention relates to an offset compensation circuit. More particularly, the present invention relates to an image sensor and offset-able reference voltage generator.

2. Description of Related Art

In recent years, more and more electronic products such as mobile phones, personal digital assistant and toys incorporate a built-in camera. To meet various personal requirements, especially portability of the mobile devices, image sensors with low power consumption and high picture quality are in great demand. FIG. 1A is a block diagram of a conventional image sensor. As shown in FIG. 1A, the image sensor comprises an array of pixels 110, a row driver/voltage generator 120, a sample and hold circuit 130, a signal gain amplifier 140 and an analog/digital (A/D) converter 150. The row driver/voltage generator 120 provides row-driving signals 121 to the pixel array 110, reference voltages 122 to the analog/digital converter 150 and the signal gain amplifier 140 and reference voltage VCL to the sample and hold pixel circuit 130. Each row electrode (not shown) of the pixel array 110 receives a corresponding row-driving signal 121. After sensing the image, the pixel array outputs the pixel signals 111 of various columns according to the timing of the column-driving signal 121. In the meantime, the pixel sample/hold circuit 130 samples and holds the pixel signals 111 from various columns. Thereafter, various sample/hold pixel signals are output in sequence as a cascade of pixel signals 131. The signal gain amplifier 140 amplifies the received pixel signals 131 to generate pixel signals 141. Typically, the analog/digital converter 150 is a pipeline A/D converter. The A/D converter 150 converts the analog pixel signals 141 into digital pixel signals 151 according to the reference voltage 122 ready for subsequent circuit processing and manipulation (only represented by a single control logic circuit 160).

In the image sensor read-out circuit, the process of generating analog reference voltage consumes the most power. In the following, the sample/hold circuit 130 inside a complementary metal-oxide-semiconductor (CMOS) image sensor is used as an example. FIG. 1B is a conventional sample/hold circuit for a CMOS image sensor. To simplify the following discussion, various pixels within the pixel array 110 are represented by a single pixel 112. In addition, only one set of the sample/hold circuits within the pixel sample/hold circuit 130 is shown. In general, the CMOS image sensor needs to sample pixel signal voltage and pixel reset voltage. During the sampling process, a reference voltage VCL is required. To sample the pixel signal voltage, the inductor-controlled switches clamp and samp_sig are closed while the inductor-controlled switches samp_rst, cb and col_addr are opened. Thus, the differential voltage between the pixel signal voltage and the reference voltage VCL is registered by a capacitor CS1. To sample the pixel reset voltage, the inductor-controlled switches clamp and samp_rst are closed while the inductor-controlled switches samp_sig, cb and col_addr are opened. Thus, the voltage differential between the pixel reset voltage and the reference voltage VCL is registered by a capacitor CS2. After sampling, the inductor-controlled switches clamp, samp_sig and samp_rst are opened. Thereafter, the inductor-controlled switch cb is closed to initiate a hold period. During the hold period, the pixel signals 111 in various columns are held in a corresponding sample/hold circuit. The sampled data inside various sample/hold circuits are output as pixel signals 131 in a cascade to the signal gain amplifier 140 by closing the inductor-controlled switch col_addr sequentially.

In practice, because of the leakage in some of the pixel photo-diodes inside the pixel array 110, the sampled pixel reset voltage is highly inaccurate. On the other hand, factors such as production offset, circuit loading and layout area of sampling capacitor often lead to a fixed pattern noise on the display screen between vertical columns. To combat this problem, a conventional technique is to install an offset-correcting circuit 170 in each sample/hold circuit within the pixel sample circuit 130. FIG. 1C shows the timing of the signals in FIG. 1B. During the signal-sampling period, the inductor-controlled switch clamp is conductive (a high voltage potential in the timing diagram indicates a conductive state for the inductor-controlled switch and an open state vice versa). Furthermore, the offset-correcting circuit 170 selects to output the voltage at point B (for example, the reference voltage VCL). Since the sampling of the pixel signal voltage and the pixel reset voltage has been described before, details are not repeated here. To correct the offset in the pixel signal, the offset-correcting circuit 170 needs to switch from connection with point B to point A after opening up the inductor-controlled switch samp_rst (at time C) but before closing the inductor-controlled switch clamp (at time D). In other words, the offset-correction circuit 170 needs to change from outputting the reference voltage VCL to the offset voltage Voffset within the time interval between time C and D. Consequently, the terminals of an offset-compensating capacitor 171 have a voltage Voffset-VCL so that the pixel signal has an offset voltage of Voffset-VCL.

Typically, the sample/hold circuits corresponding to each column of pixels must have a group of offset-correcting circuits. With the growing size of a pixel array, the number of sample/hold circuits is increased and hence more offset-correcting circuits (each offset-correcting circuit at least comprises an offset-compensating capacitor and an operational amplifier) are required. In other words, the required chip area increases (an increase in production cost) as the number of pixels is increased. In addition, to meet the timing specification, the driving capacity of the operational amplifier inside the offset-correcting circuit for driving the capacitor must be increased along with the increase in the number of pixels. Therefore, power rating of the operational amplifier is increased as well. Furthermore, there may be a mismatch between the capacitor and parasitic capacitor inside each sample/hold circuit due to production offset leading to the formation of a corresponding fixed pattern noise between each column of image pixels.

SUMMARY OF THE INVENTION

Accordingly, the present invention is directed to an image sensor capable of correcting (compensating an offset voltage) the reference voltage of a pixel sampling circuit first and hence eliminating the offset-correction circuit inside various sample/hold circuits. Hence, some chip area is saved thereby lowering production cost. Furthermore, because the number of operational amplifiers deployed inside the image sensor is decreased, power consumption is reduced. Moreover, without the need to install an offset-compensating capacitor inside each sample/hold circuit, fixed pattern noise between the columns of an image due to a mismatch resulting from an offset in the production process is prevented.

The present invention is also directed to an offset-able reference voltage generator capable of correcting (compensating an offset voltage) the output from any circuit requiring the reference voltage and lowering fixed pattern noise.

According to an embodiment of the present invention, the image sensor comprises a plurality of pixels, an offset-able reference voltage generator and a pixel sampling circuit. The pixels sense the light from an image to produce an image signal. The offset-able reference voltage generator generates a reference voltage having a voltage offset. The pixel sampling circuit is coupled to the pixels and the offset-able reference voltage generator for generating pixel signals according to the reference voltage sampled image signal. The voltage offset is able to compensate for the offset voltage in the pixel signals generated during the pixel signal generation process.

The present invention is also directed to an offset-able reference voltage generator. The reference voltage generator comprises a first inductor-controlled switch, a first capacitor, a voltage selection device and a first operational amplifier. A first terminal of the first inductor-controlled switch is coupled to an original reference voltage and a second terminal of the first inductor-controlled switch is coupled to a first terminal of the first capacitor. The voltage selection device is coupled to a second terminal of the first capacitor. The voltage selection device is used for selecting and outputting a first offset voltage or a second offset voltage. A first input terminal of the first operational amplifier is coupled to the reference voltage and a second input terminal of the first operational amplifier is coupled to a second terminal of the first inductor-controlled switch. An output terminal of the first operational amplifier is coupled to the reference voltage. During a first time period, the reference voltage generator closes the first inductor-controlled switch and triggers the voltage selection device to select and output the first offset voltage during a first period. In the meantime, the original reference voltage is sampled in the first capacitor. During a second time period, the reference voltage generator opens the first inductor-controlled switch so that the original reference voltage is held through the first capacitor.

According to an embodiment of the present invention, the voltage selection device selects and outputs the second offset voltage after opening the first inductor-controlled switch during the second time period so that the voltage at the second input terminal of the operational amplifier has a voltage offset. The quantity of the voltage offset is equal to the voltage differential between the first offset voltage and the second offset voltage.

According to an embodiment of the present invention, the offset-able reference voltage generator further comprises a second capacitor. A first terminal of the second capacitor is coupled to the second terminal of the first inductor-controlled switch and a second terminal of the second capacitor is coupled to a first voltage (for example, a ground voltage). The voltage selection device outputs the second offset voltage after opening the first inductor-controlled switch during the second time period so that the voltage at the second input terminal of the first operational amplifier has a voltage offset. The quantity of the voltage offset is equal to $(C1 \times \Delta V)/(C1+C2)$, where $C1$ represents the capacitance of the first capacitor, $C2$ represents the capacitance of the second capacitor and $\Delta V$ represents the voltage differential between the first offset voltage and the second offset voltage.

According to an embodiment of the present invention, the voltage selection device further comprises a second inductor-controlled switch, a third inductor-controlled switch, a fourth inductor-controlled switch, a fifth inductor-controlled switch, a third capacitor, a fourth capacitor and a second operational amplifier. A first terminal of the second inductor-controlled switch is coupled to the first offset voltage and a second terminal of the second inductor-controlled switch is coupled to a first terminal of the third inductor-controlled switch. A first terminal of the fourth inductor-controlled switch is coupled to the second offset voltage and a second terminal of the fourth inductor-controlled switch is coupled to a first terminal of the fifth inductor-controlled switch. A first terminal of the third capacitor is coupled to a second terminal of the second inductor-controlled switch and a second terminal of the third capacitor is coupled to a second voltage. A first terminal of the fourth capacitor is coupled to a second terminal of the fourth inductor-controlled switch and a second terminal of the fourth capacitor is coupled to a third voltage. According to the present embodiment, the second voltage and the third voltage are ground voltage, for example. An output terminal of the second operational amplifier is coupled to a first input terminal of the second operational amplifier and the second terminal of the first capacitor. A second input terminal of the second operational amplifier is coupled to a second terminal of the third inductor-controlled switch and a second terminal of the fifth inductor-controlled switch.

In the present embodiment of the present invention, the offset-correcting circuit inside various sample/hold circuits is no longer required because the reference voltage needed by the image sensor is corrected (compensated by an offset voltage) in the early stage. Hence, some chip area is saved (accompanied by a reduction of the production cost). Furthermore, since the number of operational amplifiers inside the image sensor is decreased, overall power consumption of the image sensor is also reduced. Moreover, without the need to install an offset-compensating capacitor inside each sample/hold circuit, fixed pattern noise between the columns of an image due to a mismatch resulting from an offset in the production process is also prevented.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
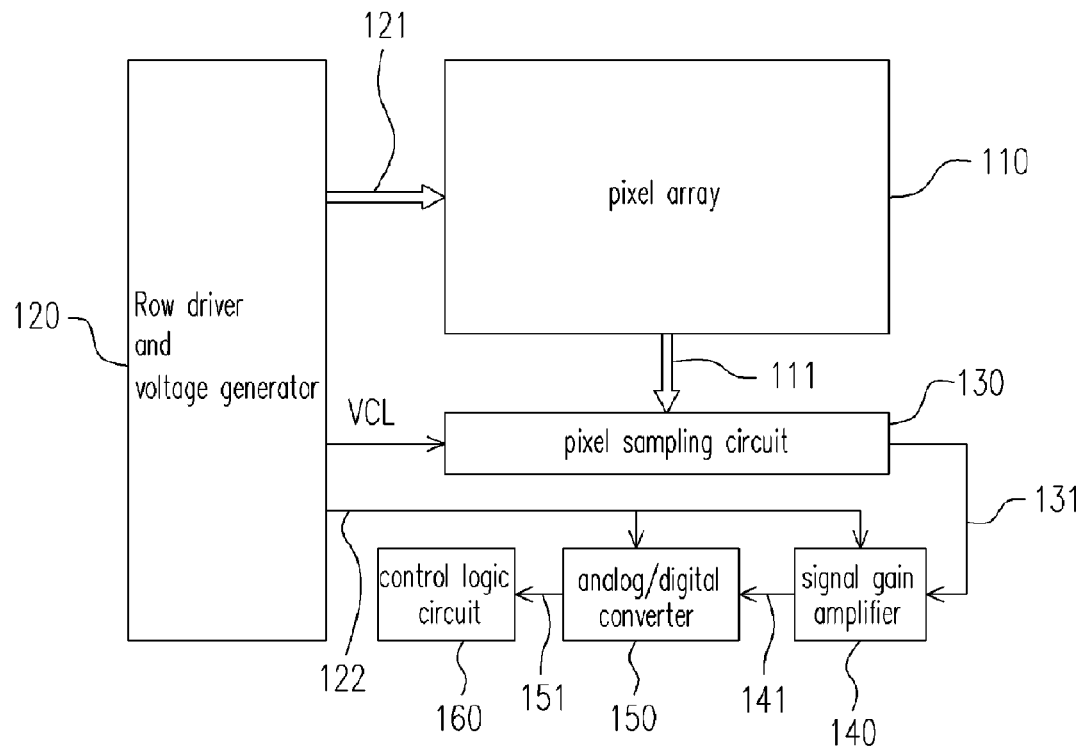
FIG. 1A is a block diagram of a conventional image sensor.
Figure 1B:
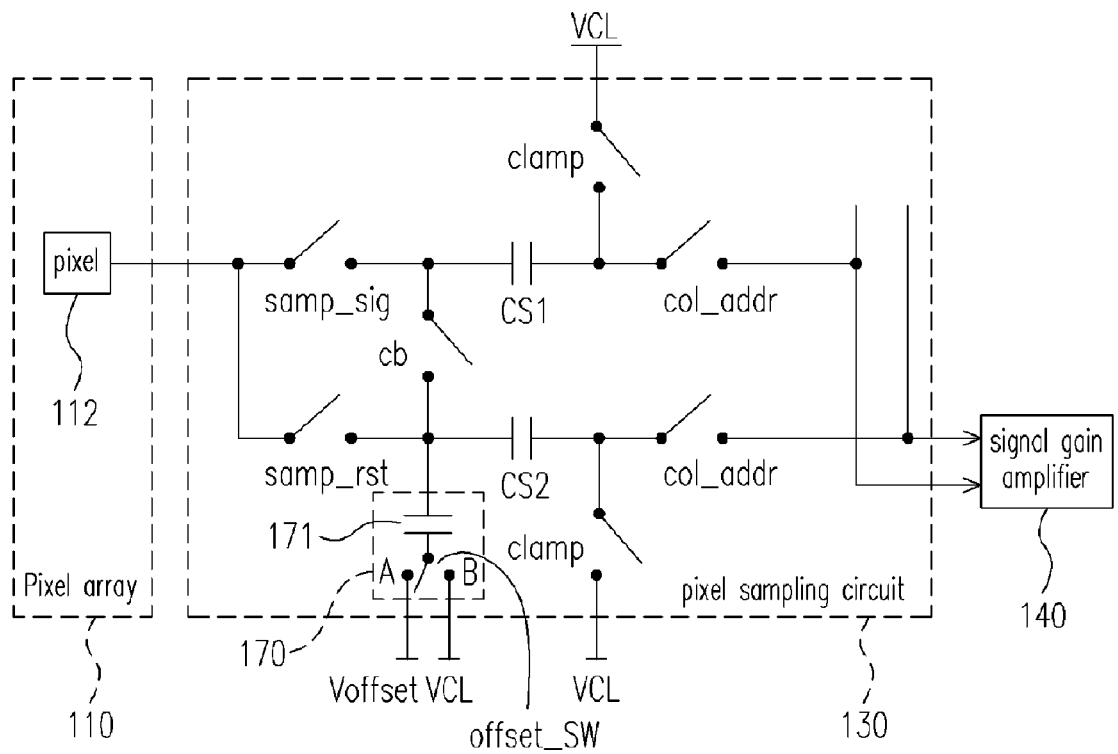
FIG. 1B is a conventional sample/hold circuit for a CMOS image sensor.
Figure 1C:
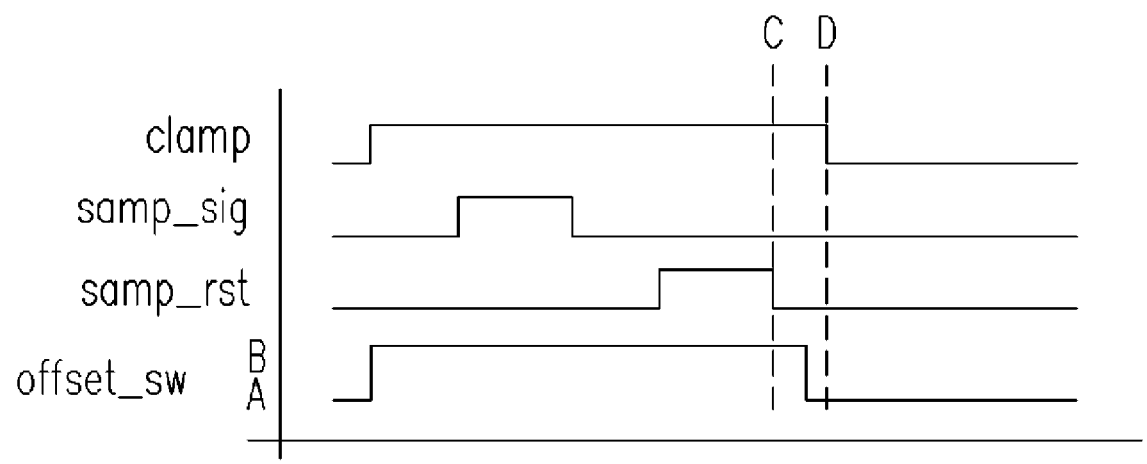
FIG. 1C shows the timing of the signals in FIG. 1B.

Reference will now be made in detail to the present preferred embodiments of the invention, examples of which are illustrated in the accompanying drawings. Wherever possible, the same reference numbers are used in the drawings and the description to refer to the same or like parts.

To simplify the following descriptions, a CMOS image sensor is used as an example. In the conventional technique, the sample/hold circuits in each column of pixels must have a corresponding set of offset-correcting circuits. However, as the number of pixels in an image sensor grow larger and larger, more and more offset-correcting circuits (each one comprising at least an offset-compensating capacitor and an operational amplifier) are required. Furthermore, the operational amplifiers for driving the offset-compensating capacitors also consume a lot of power. Hence, overall power consumption of the operation amplifiers is increased as the number of columns in a pixel array rises. Moreover, due to some offset in the production process, there may be a mismatch between the capacitor and the parasitic capacitor inside each sample/hold circuit leading to the production of fixed pattern noise between the columns of an image. Consequently, the present invention provides a solution that aims to remedy the defects in the conventional technique.

Figure 2A:
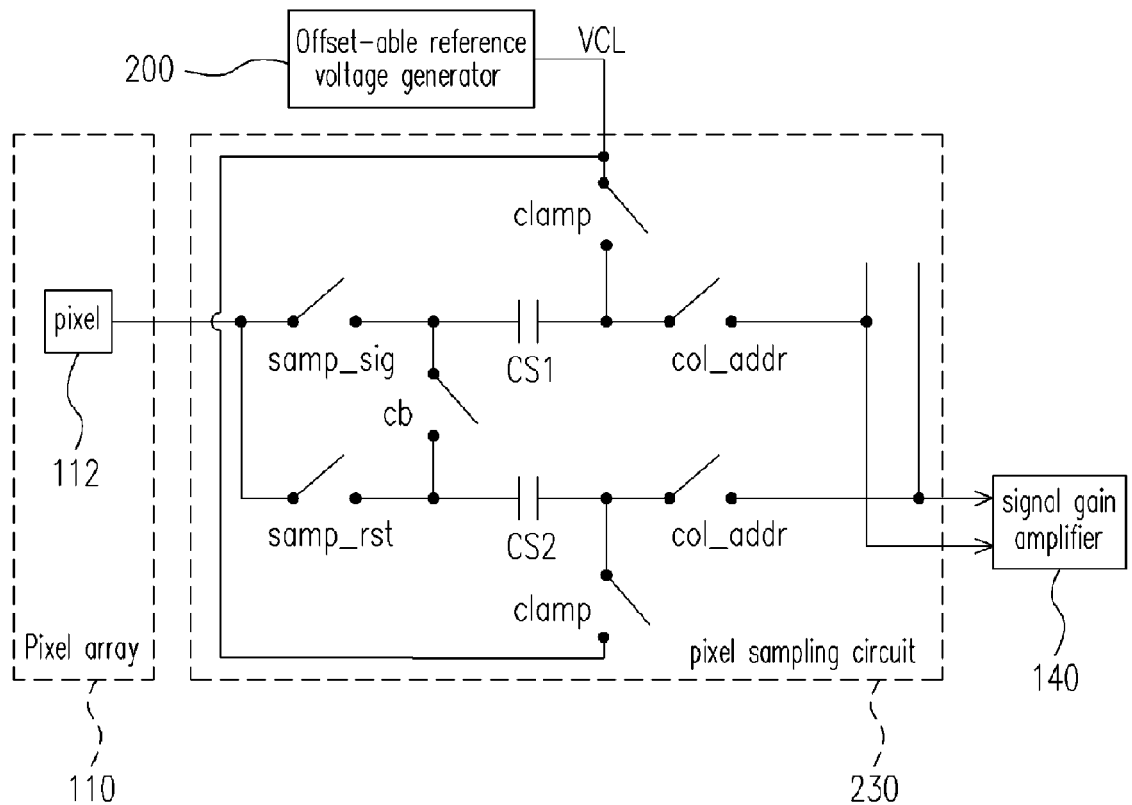
FIG. 2A is a block diagram of a pixel sampling circuit of a CMOS image sensor according to one embodiment of the present invention.

FIG. 2A is a block diagram of a pixel sampling circuit of a CMOS image sensor according to one embodiment of the present invention. To simplify the description, a single pixel 112 is used to represent each pixel in pixel array 110 in FIG. 2A. Furthermore, although the pixel sampling circuit 230 actually comprises a plurality of sample/hold circuits, only one pixel sample circuit is shown. In general, a CMOS image sensor needs to sample pixel signal voltage and pixel reset voltage based on a reference voltage VCL. The reference voltage VCL is provided through an offset-able reference voltage generator 200. Aside from providing a stable reference voltage, the offset-able reference voltage generator 200 also provide a voltage offset to the reference voltage so that the offset voltage can compensate for any offset voltage in the pixel signals during the pixel signal generation process.

During the pixel signal voltage sampling period, the inductor-controlled switches clamp and samp_sig are closed while the inductor-controlled switches samp_rst, cb and col_addr are opened. The differential voltage between the pixel signal voltage and the reference voltage VCL is registered by a capacitor CS1. During the pixel reset voltage sampling period, the inductor-controlled switches clamp and samp_rst are closed while the inductor-controlled switches samp_sig, cb and col_addr are opened. The differential voltage between the pixel reset voltage and the reference voltage VCL is registered by another capacitor CS2. When the sampling is completed, the inductor-controlled switches clamp, samp_sig and samp_rst are opened. Thereafter, the inductor-controlled switch cb is closed at the beginning of a holding period. During the holding period, the pixel signals from various columns are held within a sample/hold circuit. The inductor-controlled switch col_addr of various sample/hold circuits are sequentially closed to output a cascade of pixel signals to a signal gain amplifier 140.

Figure 2B:
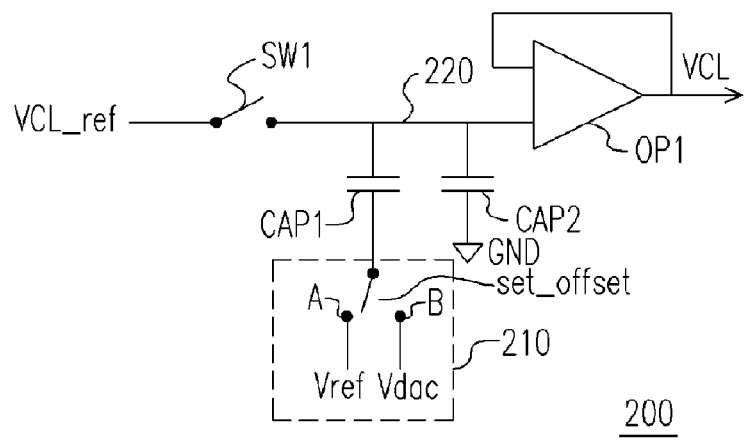
FIG. 2B is a circuit diagram of an offset-able reference voltage generator according to one embodiment of the present invention.
Figure 3:
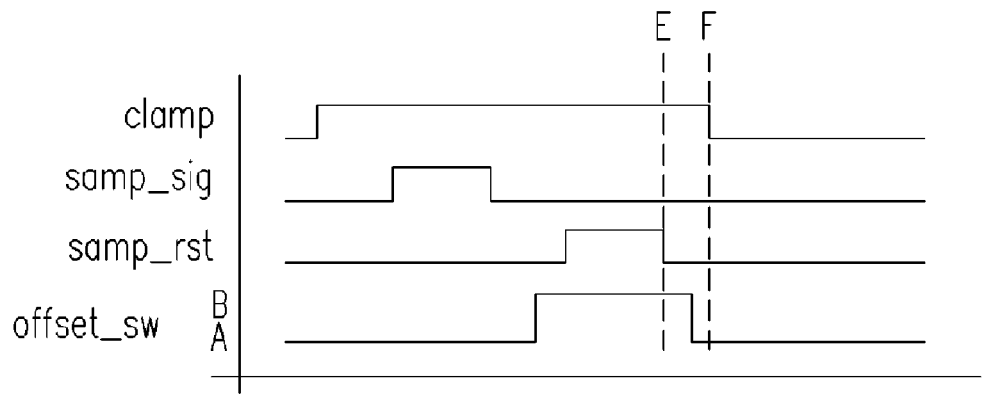
FIG. 3 is a timing diagram showing the switching of various signals in FIGS. 2A and 2B.

The aforementioned offset-able reference voltage generator 200 can be implemented according to the following embodiment. FIG. 2B is a circuit diagram of an offset-able reference voltage generator according to one embodiment of the present invention. FIG. 3 is a timing diagram showing the switching of various signals in FIGS. 2A and 2B. As shown in FIGS. 2A, 2B and 3, one terminal of an inductor-controlled switch SW1 is coupled to an original reference voltage VCL_ref. According to an inverted signal of the control signal of the inductor-controlled switch "clamp", the connection of the original reference voltage VCL_ref to another terminal is determined. In other words, when the control signal clamp in FIG. 3 is at a high potential, the inductor-controlled switch SW1 forms an open circuit (in the meantime, the switch "clamp" is close). Conversely, the inductor-controlled switch SW1 forms a close circuit (in the meantime, the switch "clamp" is open). An output terminal of an operational amplifier OP1 outputs the reference voltage VCL required by the pixel sampling circuit. At the same time, the reference voltage VCL is fed back to one of the input terminals of the operational amplifier OP1. Another input terminal of the operational amplifier OP1 is coupled to the inductor-controlled switch SW1, one terminal of a first capacitor CAP1 and one terminal of a second capacitor CAP2. Another terminal of the first capacitor CAP1 is coupled to a voltage selection device 210.

During a non-sampling period (the control signal clamp at a low potential as shown in FIG. 3), the inductor-controlled switch SW1 conducts so that the original reference voltage VCL_ref charges the first capacitor CAP1 and the second capacitor CAP2 (sample the original reference voltage VCL_ref). Meanwhile, a select switch set_offset of the voltage selection device 210 is switched to point A. The point A is coupled to a reference voltage Vref (a fixed voltage) and another point B is coupled to an offset voltage Vdac, for example. In the present embodiment, the offset voltage Vdac can be adjusted according to the required offset voltage. Anyone familiar with basic electronic skills may notice that the same effect can be achieved whether the point A is coupled to the adjustable offset voltage Vdac and the point B is coupled to the fixed reference voltage Vref or the point A and B are coupled to two separate fixed voltages or the point A and B are coupled two separate adjustable offset voltages.

During a sampling period (the control signal clamp at a high potential), the inductor-controlled switch SW1 opens so that the sampled results (the sample voltage 220) of the original reference voltage VCL_ref is held by the first capacitor CAP1 and the second capacitor CAP2. The operational amplifier OP1 receives and amplifies the reference voltage 220 to output the reference voltage VCL. After sampling the pixel signal voltage (the control signal samp_sig is at a high potential) but before sampling the pixel reset voltage (the control signal samp_rst is at a high potential), the select switch set_offset of the voltage selection device 210 switches to the point B. Thereafter, the electric potential of the reference voltage 220 rises (or falls) by an offset voltage. Hence, the reference voltage VCL also obtains a corresponding amount of offset. The amount of offset voltage is $(C1 \times \Delta V)/(C1+C2)$, where C1 represents the capacitance of the first capacitor CAP1, C2 represents the capacitance of the second capacitor CAP2, $\Delta V$ represents the differential voltage between point A and point B. In the present embodiment, C1 is about 350 fF and C2 is about 8×350 fF, for example. Therefore, the noise engendered through the first capacitor CAP1 is attenuated by 1/9. After the pixel reset voltage sampling process has finished (point E of the time line in FIG. 3) but before the end of the sampling period (point F of the time line in FIG. 3), the select switch set_offset of the voltage selection device 210 is switched back to the point A. Thus, the electric potential of the reference voltage 220 returns to the pre-offset voltage.

Since the pixel reset voltage sample capacitor CS2 has already been provided with an offset from the reference voltage VCL during the sampling pixel reset voltage period, the sampled result is still offset-compensated although there is no offset compensation in the pixel reset voltage to be sampled. Because the reference voltage generator of the present invention has the capacity to generate offset voltage, a number of offset-correcting circuits 170 inside the pixel sampling circuits 130 can be eliminated to provide many advantages.

Figure 4:
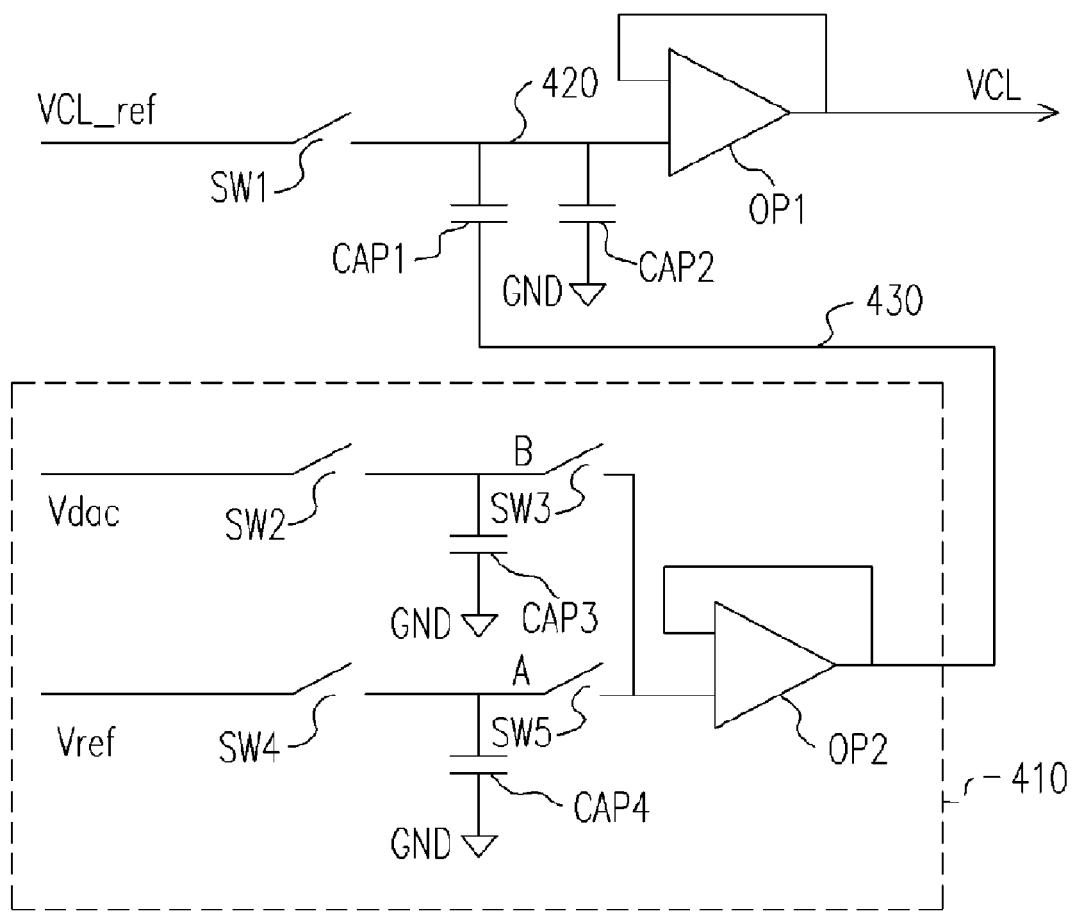
FIG. 4 is a circuit diagram of an offset-able reference voltage generator according to another embodiment of the present invention.

To explain the present invention in more detail, an embodiment is also provided. FIG. 4 is a circuit diagram of an offset-able reference voltage generator according to another embodiment of the present invention. As shown in FIGS. 3 and 4, the present embodiment is similar to the previous embodiment. One major difference is that the voltage selection device 210 is changed to a voltage selection device 410. The voltage selection device 410 comprises an operational amplifier OP2, inductor-controlled switches SW2 to SW5, a third capacitor CAP3 and a fourth capacitor CAP4. In the present embodiment, both the third capacitor CAP3 and the fourth capacitor CAP4 have a capacitance of about 3 pF, for example.

According to the inverted control signal "clamp", the inductor-controlled switch SW2 determines whether to couple the offset voltage Vdac to the point B or not. Similarly, according to the inverted control signal "clamp", the inductor-controlled switch SW4 determines whether to couple the reference voltage Vref to the point A or not. In the present embodiment, the reference voltage Vref is a fixed voltage and the offset voltage Vdac is an adjustable voltage, for example. Anyone familiar with basic electronic skills may notice that the same effect is achieved whether the inductor-controlled switch SW4 is coupled to the adjustable offset voltage Vdac and the inductor-controlled switch SW2 is coupled to the fixed reference voltage Vref or the inductor-controlled switches SW2 and SW4 are coupled to two different fixed voltages or the inductor-controlled switches SW2, SW4 are coupled two separately adjustable offset voltages.

During the non-sampling period (the control signal "clamp" in FIG. 3 is at a low potential), the inductor-controlled switches SW2 and SW4 conduct so that the offset voltage Vdac and the reference voltage Vref charge up the capacitor CAP3 and CAP4 respectively. During the sampling period (the control signal "clamp" is at a high potential), the inductor-controlled switches SW2 and SW4 are in open circuit. Hence, the offset voltage Vdac and the reference voltage Vref are held at the point B and A respectively. Meanwhile, the inductor-controlled switch SW3 is open or close according to the control signal offset_sw. Similarly, the inductor-controlled switch SW5 is open or close according to the inverted control signal offset_sw. In other words, the inductor-controlled switch SW3 is open and the inductor-controlled switch SW5 is close when the control signal offset_sw is at a low electric potential so that the voltage at the point A is sent to the operational amplifier OP2. Conversely, the inductor-controlled switch SW3 is close and the inductor-controlled switch SW5 is open when the control signal offset_sw is at a high electric potential so that the voltage at the point B is sent to the operational amplifier OP2. Since other non-described sections are identical to the first embodiment, detailed description is not repeated herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An offset-able reference voltage generator for generating a reference voltage having a voltage offset, comprising:

a first inductor-controlled switch, having a first terminal coupled to a original reference voltage;

a first capacitor, having a first terminal coupled to a second terminal of the first inductor-controlled switch;

a voltage selection device, coupled to a second terminal of the first capacitor for selecting and outputting a first offset voltage or a second offset voltage; and a first operational amplifier, having a first input terminal coupled to the reference voltage, a second input terminal coupled to the second terminal of the first inductor-controlled switch, and an output terminal for outputting the reference voltage;

wherein during a first time period, the offset-able reference voltage generator activates the first inductor-controlled switch to form a short-circuit and triggers the voltage selection device to select and output the first offset voltage so that the first capacitor samples from the original reference voltage, and during a second time period, the voltage generator activates the first inductor-controlled switch to form an open circuit so that the original reference voltage is registered by the first capacitor.

2. The offset-able reference voltage generator of claim 1, wherein the voltage selection device selects and outputs the second offset voltage within the second time period just after opening the first inductor-controlled switch so that the voltage at the second input terminal of the first operational amplifier has the voltage offset with the amount of offset equal to the voltage differential between the first offset voltage and the second offset voltage.

3. The offset-able reference voltage generator of claim 1, further comprises;

a second capacitor, having a first terminal coupled to the second terminal of the first inductor-controlled switch and a second terminal coupled to a first voltage, wherein the voltage selection device selects and outputs the second offset voltage within the second time period just after opening the first inductor-controlled switch so that the voltage at the second input terminal of the first operational amplifier has a voltage offset with the amount of offset equal to $(C1 \times \Delta V)/(C1+C2)$, wherein C1 represents the capacitance of the first capacitor, C2 represents the capacitance of the second capacitor and $\Delta V$ represents the voltage differential between the first offset voltage and the second offset voltage.

4. The offset-able reference voltage generator of claim 3, wherein the first voltage is a ground potential.

5. The offset-able reference voltage generator of claim 1, wherein the voltage selection device comprises:

a second inductor-controlled switch, having a first terminal coupled to the first offset voltage;

a third inductor-controlled switch, having a first terminal coupled to a second terminal of the second inductor-controlled switch;

a fourth inductor-controlled switch, having a first terminal coupled to the second offset voltage;

a fifth inductor-controlled switch, having a first terminal coupled to a second terminal of the fourth inductor-controlled switch;

a third capacitor, having a first terminal coupled to the second terminal of the second inductor-controlled switch and a second terminal coupled to a second voltage;

a fourth capacitor, having a first terminal coupled to the second terminal of the fourth inductor-controlled switch and a second terminal coupled to a third voltage; and a second operational amplifier, having a first input terminal, a second input terminal and an output terminal, wherein the output terminal of second operational amplifier is coupled to the first input terminal of the second operational amplifier and the second terminal of the first capacitor, and the second input terminal of the second operational amplifier is coupled to a second terminal of the third inductor-controlled switch and a second terminal of the fifth inductor-controlled switch.

6. The offset-able reference voltage generator of claim 5, wherein the second voltage and the third voltage are at ground potential.

7. The offset-able reference voltage generator of claim 1, provides the required reference voltage to an image sensor.

8. The offset-able reference voltage generator of claim 7, wherein the image sensor comprises a complementary metal-oxide-semiconductor (CMOS) image sensor.

* * * * *